United States Patent [19]

Siry et al.

[11] Patent Number: 4,501,635
[45] Date of Patent: Feb. 26, 1985

[54] MULTI-LAYER BOARD POSSESSING A VARNISH SURFACE, PROCESS FOR ITS PRODUCTION AND ITS USE

[75] Inventors: Manfred Siry, Gladbach; Hans-Dieter Diesel, Seligenstadt, both of Fed. Rep. of Germany

[73] Assignee: Letron GmbH, Aschaffenburg, Fed. Rep. of Germany

[21] Appl. No.: 510,158

[22] Filed: Jul. 1, 1983

Related U.S. Application Data

[63] Continuation of Ser. No. 242,653, Mar. 11, 1981, abandoned.

[30] Foreign Application Priority Data

Mar. 15, 1980 [DE] Fed. Rep. of Germany ....... 3010060

[51] Int. Cl.³ ............................ B05D 3/06; C09J 5/02
[52] U.S. Cl. .............................. 156/273.3; 156/275.5; 156/275.7; 156/307.4; 427/44
[58] Field of Search ................. 156/272, 307.4, 272.2, 156/273.3, 275.5, 275.7; 427/44; 428/528, 535, 913

[56] References Cited

U.S. PATENT DOCUMENTS 3,929,545 12/1975 Van Dyck et al. ................. 156/272
4,113,894 9/1978 Koch ..................................... 427/44

FOREIGN PATENT DOCUMENTS 2801396 7/1979 Fed. Rep. of Germany ...... 428/195
1223760 3/1971 United Kingdom ............... 156/272

Primary Examiner—Bruce H. Hess
Attorney, Agent, or Firm—Mandeville and Schweitzer

[57] ABSTRACT

The invention provides a multi-layer board of from 0.3 to 5.0 mm. thick, comprising an upper layer of a finishing coat which is a varnish hardened by means of electron radiation, one or more carrier films and, optionally, a backing film.

24 Claims, 1 Drawing Figure

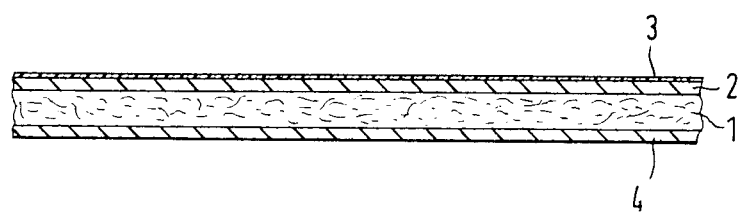

MULTI-LAYER BOARD POSSESSING A VARNISH SURFACE, PROCESS FOR ITS PRODUCTION AND ITS USE

This is a continuation of application Ser. No. 242,653, filed Mar. 11, 1981, now abandoned.

The present invention relates to a multi-layer board possessing a varnish surface, process for its production and its use.

Quite generally, the invention lies in the field of board materials as used for the production of furniture and furniture parts. Board materials of this type consist of hardboards or chipboards, which are covered with surface-improved laminate boards. The laminate boards are made up of various paper or vulcanised fibre material webs, impregnated or coated with synthetic resin, which are laminated on high pressure presses. The thickness of laminate boards of this type is generally from 0.3 to 1.2 mm, preferably from 0.4 to 0.8 mm.

The composition of the different layers of these laminate boards can be varied to a large extent. Generally, however, cheaper material webs are employed as carrier materials and higher quality webs as surface materials. The term "surface" as used in the art and herein means the plane of the final product facing the observer whilst the side facing the chipboard is the "backing".

For the surface, melamine-type synthetic resins, which combine good mechanical properties, such as abrasion resistance and impact strength, with thermal stability, have proved particularly satisfactory. However, condensation and surface formation in the case of high pressure melamine resins require elevated temperatures and high pressures, which can only be attained with discontinuous processing of single laminate bundles in plate presses.

This type of laminate board has the disadvantage that width and length are fixed by the dimensions of the press and, therefore, high offcut losses can occur. Besides, the finite production process, owing to the various production steps, such as impregnation and dimensioning, assembly of the different structures, pressing of the structures, emptying of the press, edge-planing and polishing of the finished boards and cutting to the desired size, requires a high input of labour. Furthermore, the long times needed for heating, condensation and re-cooling in the press lead to long cycle times and high manufacturing costs. However, continuous processing has hitherto not been possible, owing to the long pressing and re-cooling times required, (Holz- und Kunststoffverarbeitung, Volume 11 (1979), pages 910–913).

An important special type of board material is the so-called post-forming laminate board. The latter is formed from special paper raw materials using suitably modified melamine resins for the surface coat as well as phenolic resins for the impregnation of the core and by varying the pressing curves in the surface coating, mainly by shortening the heating and re-cooling times. Post-forming grades are especially used for the simultaneous coating of edges and planes. Yet these post-forming laminate boards, having a melamine resin surface, possess a definitely lower quality, with respect to their chemical, mechanical and heat-resistance properties, by comparison with the above-mentioned laminate boards. Besides, it was shown that the storability is limited. After a period of more than 3 months, satisfactory further processing of these post-forming laminate boards is no longer possible due to advanced condensation, which is shown by increased cracking tendency of this surface material.

A further disadvantage, which is common to the high pressure laminate boards as well as the post-forming laminate boards produced with the use of melamine resins, lies in the limited conditioned storability of the required pre-impregnates, in which, owing to the slow advance of condensation, a changed rheological behaviour of the resin in the press causes the appearance of mat and glossy areas in the finished surface.

In order to overcome the disadvantages of the discontinuously produced normal and post forming grades, based on melamine resins, various continuous processes have been applied. For example, according to West German Offenlegungsschrift No. 24 54 296, a process for the production of endless laminate material, coated with melamine resin, is known, which works with special resinous impregnating solutions and resin preparations for the surface layers. While it is possible to press low pressure melamine resins by the endless process in this way, the products thus produced possess all the disadvantages, already mentioned, due to lack of storability. A further point is that laminate boards, coated in this endless process with melamine resin of normal quality, can only be structured with great effort and, furthermore, post-forming grades thus manufactured do not attain the surface resistance of the standard grade.

On the other hand, other synthetic coating resin systems which permit endless processing, e.g. polyester resins dissolved in styrene, according to West German Offenlegungsschrift No. 21 24 139, supply endless products with laminar structure. These however while not showing any problems regarding storability do not comply with the German Standards regarding surface properties (DIN No. 53 799) load down in the furniture industry for laminate boards.

It was therefore an object of the invention to develop a "laminate board", which (1) can be produced by the endless process, which (2) corresponds to the melamine standards in its mechanical and heat-resistance properties and (3) can be produced without difficulty, regardless of the storability of the initial products used as well as of the finished products produced. Accordingly, the subject of the invention is a multi-layer board, possessing a varnish surface and having a thickness of from 0.3 to 5.0 mm, which is characterised by an upper layer of a finishing coat that is finished with a varnish hardened by means of electron radiation, one or more carrier films and, optionally, a backing film.

The varnishes used, which are hardenable by electron radiation, are those known in the art. These varnishes are characterised, e.g. according to West German Offenlegungsschrift No. 20 51 467, in that they possess a plurality of $>C=C<$ groups in the polymer molecule. For easier hardening, these groups are preferably $CH_2=C<$ groups, which are attached to the polymer chain. "Plurality" should be taken to mean at least 3 or, on average, more than 2 groups. As is indicated in West German Offenlegunsschrift No. 21 59 303, particularly polymerisable resins with terminal acrylate or methacrylate groups or $\alpha,\beta$-olefinically unsaturated organic resins are usable. Such resins are, inter alia, unsaturated polyester resins, acrylic resins, modified organic resins, silicone-modified organic resins and epoxy resins.

These resins can be employed undiluted or, alternatively, diluted with a solvent, usually in a mono-, di-, tri- or tetra-functionally crosslinkable monomer, serving as solvent. The resins described above may contain customary additives, such as photo-sensitizers for ultraviolet radiation, matting agents, thixotropic agents, dyes, pigments, stabilisers and fillers.

The process for the production of the board defined above is characterised according to the invention in that a finishing coat is continuously pressed as the upper layer with one or more carrier films and, optionally, a backing film, optionally with application of elevated temperature, and the finishing coat is varnished, before or after pressing, with a varnish that is hardenable by electron radiation, and is hardened with electron radiation.

According to a variant of this process, a multi-layer board, consisting of finishing layer, at least one carrier film and one backing film, is initially used and the finishing layer is then coated with a varnish that is hardenable by electron radiation, and is hardened with electron radiation.

According to a preferred embodiment, however, a finishing layer is first coated with a varnish that is hardenable by electron radiation, is then hardened with electron radiation and this finishing layer, which is ready as such, is pressed with at least one carrier film and one backing film, as described.

The varnish, hardenable by electron radiation, is applied to the finishing layer in the form of a thin layer in an application quantity of from 5 to 80 g/m$^2$, particularly from 10 to 40 g/m$^2$. The application quantity depends on the degree of pigmentation and the absorptive capacity of the carrier material suggested by the intended use. On the basis of the application quantities used, layer thicknesses of from 2 to 50 $\mu$m, especially from 5 to 20 $\mu$m, result.

The coat of varnish resin can be applied in different ways, e.g. by curtain-coater, roller-coater, sprayer or wire blade.

Application and hardening of the varnish may be effected in a unit as described in the journal, Industrie Lackierbetrieb (Industrial Coating), Volume 4 (1979), pp. 123–125.

According to the technique described in the Industrie Lackierbietrieb article, the source of energy for starting the chemical bonding reaction in varnish coatings, adhesives, or printing inks is the electron accelerator. Said accelerator works in the System ESH 150 with acceleration voltages of 150 to 180 kV, and, according to the necessary working width, 20 to 200 mA electron current is used.

Electrons emit from a glowing cathode and are spread fanwise, with the electromagnetic deflecting system in the high vacuum, into a large area radiation curtain. The electrons, accelerated in this manner, exit into the air, through a thin metal foil, and are conducted to the material intended to be radiated.

The encased electrons are slowed down within the coating materials to be bonded, said electrons emit their energy which (energy) starts off the bonding reactions. The electron accelerator works in one stage and vacuum insulated and is, therefore, simple to control and operate. The physical and constructive design is in accord in all details with the safety regulations of the German X-ray Directive ROV for the protection against damage by X-rays. The operators are, therefore, not subject to any limitations, since the local dose quantity is less than 0.05 mR.h at a distance of 5 cm from the touched surface of the installation.

The multi-layer board according to the invention preferably has a thickness of at least 0.4 mm. Preferably, it has a thckness of at most 2.5, with particular preference for 0.8 mm.

Materials known according to the state of the art are usable for the finishing layer, the carrier film and the backing film, e.g. papers, fleeces, textile webs and vulcanised fibre, which may be impregnated with resins based on phenol, urea/formaldehyde, melamine, acrylic resin dispersions, with water-glass or with mixtures of same.

The preferred finishing layer is a paper sheet, optionally impregnated with synthetic resin. The synthetic resins, preferred for this purpose, are urea/formaldehyde resins, which may be blended with acrylic resin dispersions.

Similarly, paper sheets, preferably impregnated, are usable as carrier films, impregnation being preferably effected with amino-resins, polyester resins, acrylic dispersions or mixtures of these.

Similarly, impregnated paper sheets may be used for the backing film, the resins, mentioned above for the carrier film, and/or water-glass being preferred as impregnating agents.

Lamination of the films can be effected at high speed. For the example, speeds within the range of from 5 to 35 m/min. are feasible. The speed is preferably at least 8, with particular preference for at least 12 m/min. The upper limit for the speed preferably lies at 30, with particular preference for 25 m/min. Lamination is effected with particular advantage between pairs of rollers.

For the process according to the invention, carrier films and/or backing films can be employed, the impregnation medium of which has not yet partially or completely hardened before lamination. For example, hardened carrier films and backing films that have not yet or only partially hardened may be employed, or vice versa. Preferably, carrier films and/or backing films with hardened impregnating medium are used for lamination. It is useful in this case for adhesive resin coats to be provided between the carrier films and/or backing films, which appropriately remain reactive so that they harden only during the later pressing of the multi-layer board according to the invention with the surfaces to be coated.

If carrier films and/or backing films are employed that have an impregnating medium, which has not or only partially hardened, lamination can be effected in such a way that hardening of this impregnating medium takes place or essentially does not occur.

The upper varnish coat which is hardenable by electron radiation, is however hardened. The multi-layer board according to the invention thus comprises the unusual combination of partially hardened, and essentially partially non-hardened synthetic materials. In spite of these varying hardening stages of the various synthetic material of the multi-layer board according to the invention, the latter can be produced in an extremely simple manner, but, on the other hand, possesses quite excellent application properties, as will be explained hereinafter. A particularly advantageous property, despite the existence of the essentially not yet hardened synthetic materials, is that the board according to the invention possesses unlimited storability for practical purposes.

Preferably, the surface is structured during or after lamination. If, for example, the finishing layer possesses a wood grain appearance, structuring can be effected corresponding to the cells of the wood grain texture shown. Structuring is effected e.g. by employing suitably embossed rollers in or before the press or by joint running with structure-imparting films.

Lamination can be effected by using a carrier film, impregnated with melamine resin or phenolic resin, as a joint. Similarly, however, an adhesive system that is capable of being thermally activated or a reactive adhesive system can serve as the joint. The adhesive may be fed liquid or in form of a pre-coated and already evaporated or pre-condensed carrier film or a film sheet, which is suitably pre-coated on one side and is coated on the other surface with a hardened varnish, based on a synthetic resin that is hardenable by electron radiation.

The board according to the invention can be produced in considerable widths. Widths of more than 1 m. are preferred; those of from 1.2 to 1.4 m, approximately, are particularly preferred. It is astonishing and surprising that boards of such width can be continuously produced at the high lamination speeds described. After production, the board, if it is sufficiently thin and still pliable, is rolled up or it is dimensioned.

The board according to the invention can be produced by the endless process. It corresponds in its mechanical and heat-resistance surface properties to the quality of melamine resin surfaces and it does not show any processing problems arising from storability. Furthermore, types having good post-forming properties can be produced. Besides the boards according to the invention are distinguished from boards coated with melamine resin in that they do not possess the "cold feel" of the latter, but possess "warm" varnish feel.

The boards according to the invention may be used for the covering of the surfaces of furniture and furniture parts. It is also possible, however, by cutting them open, to produce edge-strips for various application ranges, such as for example, standard edge-strips, grooved edges, edges suitable for heating tape application and the like.

EXAMPLE 1

A laminate fabricated from the layer materials listed below in a working width of 1.3 m on a laminated device, comprising pairs of rollers, at a speed of 10 m/min.,
  (a) upper side: a decorative paper sheet, impregnated with a blend based on urea/formaldehyde resin and acrylic dispersion;
  (b) intermediate layer: a barrier paper, resin-coated with unsaturated polyester resins to the extent of about 150%;
  (c) bottom side: a barrier paper, asymmetrically resin-coated with amino-resins
is coated by means of a wire blade with a synthetic resin, based on urethane/acrylate, which is hardenable by electron radiation. The quantity of varnish applied is from 25 to 30 g/m$^2$, approximately. Hardening is effected by means of energy-rich electrons.

Coating and hardening are carried out at a speed of from 35 to 40 m/min.

The laminate, used as starting material, has a layer thickness of 0.7 mm, the varnish applied has a layer thickness of from 20 to 25 μm.

The board is characterised by high surface hardness, with relatively good flexibility at the same time, even for long storage times.

The board can be used for covering chipboards, i.e. both the faces and edges.

EXAMPLE 2

An endless-fabricated decorative paper sheet, which is impregnated with synthetic resin, based on urea/formaldehyde resin and acrylic resin dispersions, is coated with a polyester resin, hardenable by electron radiation, and hardened with electron radiation as described in Example 1.

The film sheet thus produced is applied by means of a thermo-reactive adhesive system to a carrier material of the following composition:
  (a) impregnation of urea/formaldehyde resin on bleached or unbleached sulphate cellulose fibres;
  (b) impregnation of pure acrylic resin dispersions on bleached or unbleached sulphate cellulose fibres.

The lamination speed is 30 m/min. The finished product has a layer thickness of 0.7 mm, the surface layer of resin, hardened by electron radiation, possessing a thickness of from 25 to 30 μm.

According to the resin composition, the product is flexible to hard and is distinguished by outstanding thermal resistance of the surface. It can be used as post-forming grade for the covering of planes and edges as well as being satisfactory as a laminate board for working surfaces, e.g. for kitchen furniture.

During the application of the film sheet to the carrier material, a structured surface can be created in the surface layer by a structuring roller.

EXAMPLE 3

The carrier layer materials (a) and (b), mentioned in Example 2, are pre-coated, each separately, with a thermo-reactive adhesive system and joined together with a film sheet from Example 2 in a continuously running press, with application of pressure and temperature. The lamination speed is 30 m/min.

A product is formed, which is equivalent in its properties to that described in Example 2. It can also be used in the same way.

During the laminating operation, a structured surface can be created in the surface of the top layer by means of a simultaneously running structure-imparting film. For example, a wood cell imitation or a fancy structure can be incorporated in this way. Structuring in the surface layer, however, can also be achieved by the use of a structuring roller during or immediately after the laminating operation.

The invention is illustrated in detail in the attached drawing. It represents a diagrammatic representation a cross-section through a multi-layer board according to the invention. The carrier film 1 is provided with the finishing layer 2, on which there is the layer 3, consisting of varnish, hardened by electron radiation. The backing firm is denoted as 4.

We claim:
1. Process for the continuous production of a multi-layer board of from 0.3 to 5.0 mm, comprising:
  (a) varnishing a finishing layer with a varnish which is hardenable by electron radiation,
  (b) hardening in one step said varnish by electron radiation prior to lamination of said finishing layer,
  (c) continuously laminating at speeds of from 5 to 35 m/min. by pressing with application of elevated temperatures, said hardened finishing layer with a carrier layer and a backing layer.

2. Process according to claim 1, characterised in that the board has a thickness from 0.4 mm. to 2.5 mm.

3. Process according to claim 1, characterised in that the board has a thickness of at most 0.8 mm.

4. Process according to claim 1, characterised in that the finishing layer is a paper sheet.

5. Process according to claim 4, wherein said finishing layer paper sheet is impregnated with synthetic resin.

6. Process according to claim 4, wherein said carrier layer comprises a paper sheet impregnated with amino resins, which sheet is partially hardened.

7. Process according to claim 6, wherein said backing layer comprises an impregnated paper sheet which is hardened.

8. Process according to claim 7, wherein said backing layer paper sheet is impregnated with amino resins, polyester resins and/or water glass and is hardened.

9. Process according to claim 1, wherein pressing is effected between pairs of rollers.

10. Process according to claim 1 to 9, characterised in that pressing is effected between pairs of rollers.

11. Process according to claim 1 to 9, characterised in that lamination is effected at a speed of from 5 to 35 m/min.

12. Process according to claim 11, characterized in that the pressing is effected at a speed of from 12 to 25 m/min.

13. Process according to claim 1, wherein the varnish surface is given a three-dimensional shape.

14. Process according to claim 1, wherein said pressing is effected under conditions of elevated temperature.

15. Process for the continuous production of a multilayer board of from 0.3 to 5.0 mm, comprising:
 (a) varnishing a finishing layer with a varnish which is hardenable by electron radiation,
 (b) hardening in one step said varnish by electron radiation prior to lamination of said finishing layer,
 (c) continuously laminating at from 5 to 35 m/min. by pressing with application of elevated temperatures said hardened finishing layer with a carrier layer and a backing layer.

16. Process according to claim 15, wherein said finishing layer comprises a paper sheet.

17. Process according to claim 16, wherein
 (a) said carrier layer comprises a paper sheet impregnated with amino resins and partially hardened, and
 (b) said backing layer comprises a paper sheet impregnated with amino resins, acrylic dispersions and/or water glass and is hardened.

18. Process for the continuous production of a multilayer board of from 0.3 to 5.0 mm, comprising:
 (a) varnishing a finishing layer with a varnish which is hardenable by electron radiation,
 (b) hardening in one step said varnish by electron radiation prior to lamination of said finishing layer,
 (c) continuously laminating at from 5 to 35 m/min. by pressing with application of elevated temperatures said hardened finishing layer with a thermo-reactive adhesive and a backing layer.

19. Process according to claim 18, wherein the varnish surface is given a three-dimensional shape.

20. Process according to claim 18, wherein the finishing layer comprises a paper sheet impregnated with synthetic resins.

21. Process according to claim 20, wherein the backing layer which is pressed with the adhesive and the finishing layer, comprises a paper sheet which is impregnated with amino resins, polyester resins and/or water glass and is hardened.

22. Process for the continuous production of a multilayer board of from 0.3 to 5.0 mm, comprising:
 (a) varnishing a finishing layer with a varnish which is hardenable by electron radiation,
 (b) hardening in one step said varnish by electron radiation prior to lamination of said finishing layer,
 (c) continuously laminating at from 5 to 35 m/min. by pressing with application of elevated temperatures said hardened finishing layer with a thermo-reactive adhesive and a backing layer.

23. Process of claim 22, wherein the finishing layer comprises a paper sheet.

24. Process of claim 23, wherein the carrier layer further comprises
 (a) a paper sheet impregnated with amino acids and partially hardened, and
 (b) said backing layer comprises a paper sheet impregnated with amino resins, acrylic dispersions and/or water glass and is hardened.

* * * * *